(12) United States Patent
Ouyang et al.

(10) Patent No.: US 7,580,379 B2
(45) Date of Patent: Aug. 25, 2009

(54) TECHNIQUE FOR DYNAMIC BIN ALLOCATION

(75) Inventors: Feng Ouyang, Holmdel, NJ (US);
Patrick Duvaut, Seabright, NJ (US);
Chengshu Wang, Morganville, NJ (US)

(73) Assignee: Conexant, Inc., Red Bank, NJ (US)

( * ) Notice: Subject to any disclaimer, the term of this patent is extended or adjusted under 35 U.S.C. 154(b) by 825 days.

(21) Appl. No.: 10/824,611

(22) Filed: Apr. 15, 2004

(65) Prior Publication Data

US 2005/0232172 A1    Oct. 20, 2005

(51) Int. Cl.
*H04J 1/00*    (2006.01)
(52) U.S. Cl. ..................... 370/281; 370/282; 370/295
(58) Field of Classification Search ............. 370/204, 370/208, 209, 210, 252, 247, 246, 275, 276, 370/281, 295, 430, 480, 481, 329, 332–334, 370/248; 375/224, 226, 227, 213
See application file for complete search history.

(56) References Cited

U.S. PATENT DOCUMENTS 6,263,048 B1 *   7/2001   Nelson et al. ............ 379/27.03
7,133,441 B1 *  11/2006   Barlev et al. ................ 375/222
7,149,190 B1 * 12/2006   Li et al. ...................... 370/278

OTHER PUBLICATIONS

ATIS Standard, "Spectrum Management for Loop Transmission Systems," Feb. 17, 2003.
ITU-T Standard, "G.992.1: Asymmetrical Digital Subscriber Line (ADSL) Transceivers," Jun. 1999.

* cited by examiner

*Primary Examiner*—Jayanti K Patel
*Assistant Examiner*—Anthony Sol
(74) *Attorney, Agent, or Firm*—Thomas, Kayden, Horstemeyer & Risley, LLP

(57) ABSTRACT

A technique for dynamic bin allocation is disclosed. In one particular exemplary embodiment, the technique may be realized as a method for dynamic bin allocation. The method may comprise obtaining link performance data based on a plurality of test transmissions between two network elements, wherein the plurality of test transmissions utilize at least one transmission mode in each of a plurality of frequency ranges. The method may also comprise determining a desired transmission scheme, wherein each of the plurality of frequency ranges is designated for at least one of the at least one transmission mode based at least in part on the link performance data. The desired transmission scheme may be determined by identifying a desired transmission mode for each of the plurality of frequency ranges, or the desired transmission scheme may be selected from a plurality of predetermined transmission schemes.

12 Claims, 4 Drawing Sheets

TECHNIQUE FOR DYNAMIC BIN ALLOCATION

FIELD OF THE INVENTION

The present invention relates generally to telecommunications and, more particularly, to a technique for dynamic bin allocation.

BACKGROUND OF THE INVENTION

Digital Subscriber Line (DSL) has become popular in recent years because it can provide high-bandwidth connections between a telephone switching station and a home or office over existing telephone lines. DSL technologies use sophisticated modulation schemes to pack data onto copper wires of plain old telephone system (POTS). Among the exiting DSL technologies, Asymmetric Digital Subscriber Line (ADSL) is the most practical since it fits average users' need for greater downstream bandwidth than upstream bandwidth.

Discrete Multi-tone (DMT) is a method of modulating a DSL signal for transmission on a usable frequency spectrum divided into a plurality of sub-carriers or frequency channels. For example, a spectrum may be divided into 256 channels ("bins") of 4.3125 kHz each. The center frequency of a bin is 4.3125 kHz multiplied by the bin number. Thus, a specific bin may be referred to by its bin number instead of its actual frequency range. Dividing the frequency spectrum into multiple channels reduces cross-talk in signal transmissions. In a DMT system, a usable frequency spectrum is typically allocated to the upstream and downstream transmissions based on a standard scheme. For example, according to International Telecommunication Union (ITU) standard G.992.1 (Annex A), the downstream transmission may occupy bins 6 through 255 and the upstream transmission may occupy bins 6 through 31. In a common operation mode, to reduce near-end cross-talk (NEXT), the downstream transmission may start from bin 33. Other standards or schemes also exist that allow an overlap in bin allocations to the upstream and downstream traffic.

However, none of the fixed bin allocation schemes can consistently achieve optimal data rates. Due to the ever-changing operation environment (e.g., noise level, loop attenuation and echo rejection rate), quality of a connection based on a particular scheme usually drifts over time. Especially when the cross-talk noises become highly asymmetric, it may be difficult to rely on a fixed bin allocation scheme to maintain link performance. As a result, the available bandwidth is not fully utilized and customers may become dissatisfied with inconsistent link performance.

In view of the foregoing, it would be desirable to provide an efficient and cost effective solution for bin allocation that overcomes the above-described inadequacies and shortcomings.

SUMMARY OF THE INVENTION

According to the present invention, a technique for dynamic bin allocation is provided. In one particular exemplary embodiment, the technique may be realized as a method for dynamic bin allocation. The method may comprise obtaining link performance data based on a plurality of test transmissions between two network elements, wherein the plurality of test transmissions utilize at least one transmission mode in each of a plurality of frequency ranges. The method may also comprise determining a desired transmission scheme, wherein each of the plurality of frequency ranges is designated for at least one of the at least one transmission mode based at least in part on the link performance data.

In accordance with other aspects of this particular exemplary embodiment of the present invention, the link performance data may be obtained for each of the plurality of frequency ranges, and the desired transmission scheme may be determined by identifying a desired transmission mode for each of the plurality of frequency ranges based at least in part on the link performance data. And the test transmissions may be based on the at least one transmission mode.

In accordance with further aspects of this particular exemplary embodiment of the present invention, the link performance data may be obtained for each of a plurality of predetermined transmission schemes, and the desired transmission scheme may be selected from the plurality of predetermined transmission schemes based at least in part on the link performance data. And the test transmissions may be based on the plurality of predetermined transmission schemes.

In accordance with additional aspects of this particular exemplary embodiment of the present invention, the method may further comprise communicating the desired transmission scheme to at least one of the two network elements and continue communications between the two network elements based on the desired transmission scheme.

In accordance with another aspect of this particular exemplary embodiment of the present invention, the plurality of frequency ranges may be defined based on a discrete multi-tone (DMT) modulation or an orthogonal frequency division multiplexing (OFDM) technology.

In accordance with yet another aspect of this particular exemplary embodiment of the present invention, the link performance data may comprise at least one of a data rate, an error rate, a signal-to-interference ratio, and a signal-to-noise ratio.

In accordance with still another aspect of this particular exemplary embodiment of the present invention, the at least one transmission modes may comprise at least one of a full duplex mode, an upstream-only mode, and a downstream-only mode.

In accordance with a further aspect of this particular exemplary embodiment of the present invention, the test transmissions may be performed at a maximum transmission power for each of the plurality of frequency ranges.

In accordance with a yet further aspect of this particular exemplary embodiment of the present invention, the two network elements may communicate over a digital subscriber line (DSL).

In another particular exemplary embodiment, the technique may be realized by a system for dynamic bin allocation. The system may comprise a first network element and a second network element, wherein each of the first network element and the second network element comprises at least a processor module and a transceiver module. The first network element and the second network element may be coordinated to obtain link performance data based on a plurality of test transmissions between the first network element and the second network element, wherein the plurality of test transmissions utilize at least one transmission mode in each of a plurality of frequency ranges, and to determine a desired transmission scheme, wherein each of the plurality of frequency ranges is designated for at least one of the at least one transmission mode based at least in part on the link performance data.

In yet another particular exemplary embodiment, the technique may be realized by a system for dynamic bin allocation. The system may comprise means for obtaining link performance data based on a plurality of test transmissions between two network elements, wherein the plurality of test transmissions utilize at least one transmission mode in each of a plurality of frequency ranges, and means for determining a desired transmission scheme, wherein each of the plurality of frequency ranges is designated for at least one of the at least one transmission mode based at least in part on the link performance data.

In still another particular exemplary embodiment, the technique may be realized by a computer readable medium having code for causing a processor to perform dynamic bin allocation. The computer readable medium may comprise code adapted to obtain link performance data based on a plurality of test transmissions between the first network element and the second network element, wherein the plurality of test transmissions utilize at least one transmission mode in each of a plurality of frequency ranges, and code adapted to determine a desired transmission scheme, wherein each of the plurality of frequency ranges is designated for at least one of the at least one transmission mode based at least in part on the link performance data.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

For illustration purposes, the technique for dynamic bin allocation in accordance with the present invention will be described below with specific reference to DSL applications. However, it should be appreciated that this technique may be applicable or adaptable to any bi-directional communications utilizing bin allocation or frequency division. For example, this technique may be useful with Orthogonal Frequency Division Multiplexing (OFDM) technology in wireless applications.

Figure 1:
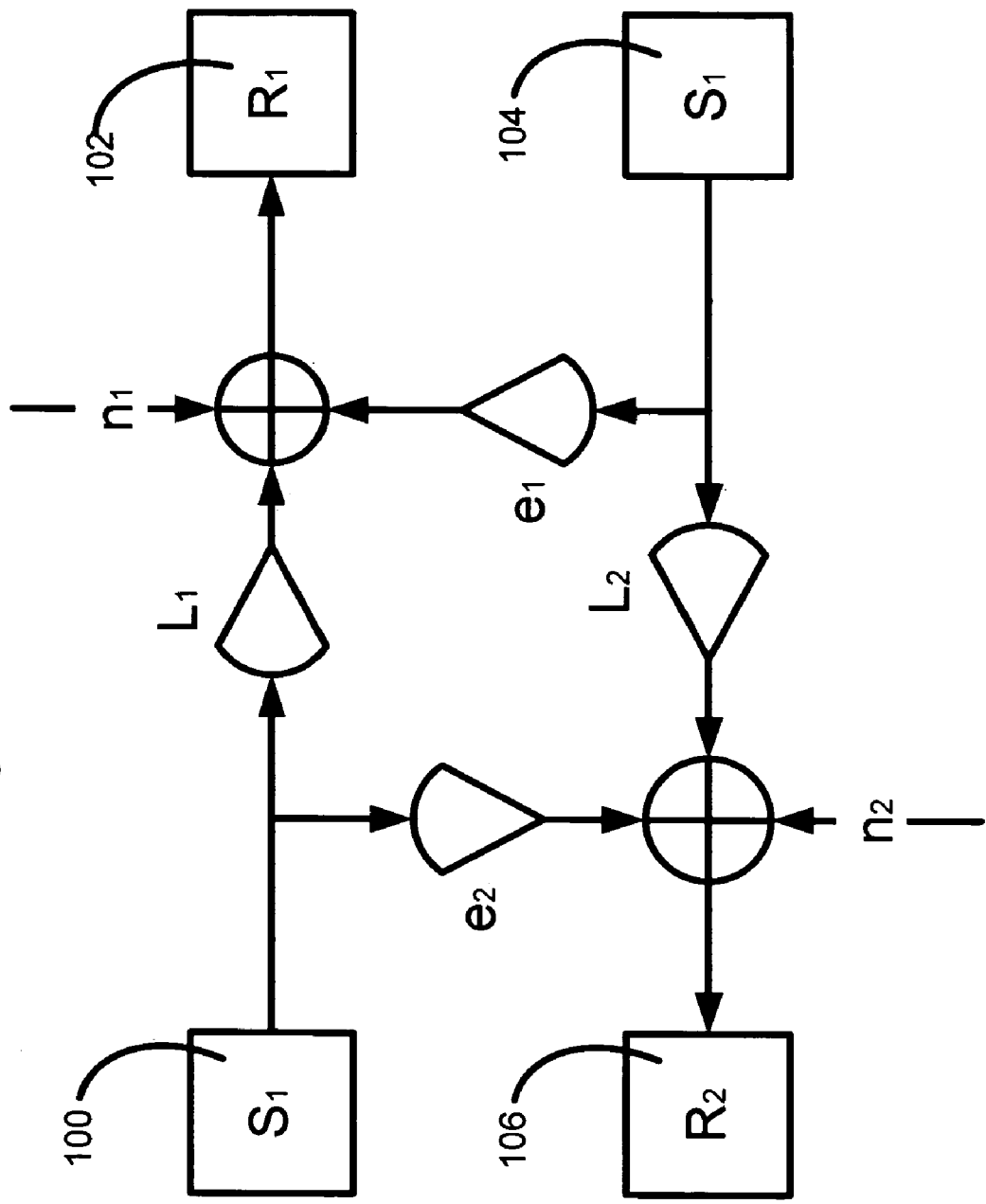
FIG. 1 is a conceptual diagram illustrating a duplex communication model in accordance with an embodiment of the present invention.

Referring to FIG. 1, there is shown a conceptual diagram illustrating a duplex communication model in accordance with an embodiment of the present invention. In this figure, a bi-directional communication path is simplified into two pairs of senders and receivers. Sender 100 transmits signal $S_1$ towards receiver 102, wherein signal $S_1$ is attenuated by a factor of $L_1$ (channel loss) and interfered by noise $n_1$ and cross-talk ($e_1$) before reaching receiver 102 with signal strength $R_1$. Similarly, sender 104 transmits signal $S_2$ towards receiver 106, wherein signal $S_2$ is attenuated by a factor of $L_2$ (channel loss) and interfered by noise $n_2$ and cross-talk ($e_2$) before reaching receiver 106 with signal strength $R_2$. The signal-to-noise ratios (SNRs) are:

$$SNR_1 = \frac{L_1 S_1}{n_1 + e_1 S_2}$$

$$SNR_2 = \frac{L_2 S_2}{n_2 + e_2 S_1}$$

for the $S_1$-to-$R_1$ and the $S_2$-to-$R_2$ directions respectively. Since the DMT bound of allowable data rate is proportionate to log(1+SNR), in order to maximize the total data rate (i.e., the sum of data rates for both directions), it may be necessary to maximize $$J \equiv (1 + SNR_1)(1 + SNR_2)$$

$$= \left(1 + \frac{L_1 S_1}{n_1 + e_1 S_2}\right)\left(1 + \frac{L_2 S_2}{n_2 + e_2 S_1}\right)$$

wherein the signal strengths are limited by their maximum values:
$0 \leq S_1 \leq S_{m1}$
$0 \leq S_2 \leq S_{m2}$.

Since $$\frac{dJ}{dS_1} = \frac{L_1}{n_1 + e_1 S_2}\left(1 + \frac{L_2 S_2}{n_2 + e_2 S_1}\right) - \left(1 + \frac{L_1 S_1}{n_1 + e_1 S_2}\right)\frac{L_2 e_2 S_2}{(n_2 + e_2 S_1)^2}$$

$$= \frac{L_1(n_2 + e_2 S_1)^2 + L_1 L_2 S_2(n_2 + e_2 S_1) - L_2 e_2 S_2(n_1 + e_1 S_2) - L_1 L_2 e_2 S_2 S_2}{(n_1 + e_1 S_2)(n_2 + e_2 S_1)^2}$$

$$= \frac{L_1(n_2 + e_2 S_1)^2 + L_1 L_2 n_2 S_2 + L_1 L_2 e_2 S_1 S_2 - L_2 e_2 n_1 S_2 - L_2 e_2 e_1 S_2^2 - L_1 L_2 e_2 S_2 S_2}{(n_1 + e_1 S_2)(n_2 + e_2 S_1)^2}$$

$$= \frac{L_1(n_2 + e_2 S_1)^2 + L_1 L_2 n_2 S_2 - L_2 e_2 n_1 S_2 - L_2 e_2 e_1 S_2^2}{(n_1 + e_1 S_2)(n_2 + e_2 S_1)^2}$$

$$= \frac{L_1}{(n_1 + e_1 S_2)} + \frac{L_1 L_2 n_2 S_2 - L_2 e_2 n_1 S_2 - L_2 e_2 e_1 S_2^2}{(n_1 + e_1 S_2)(n_2 + e_2 S_1)^2}$$

the maximum of J can only occur at the boundaries of the region $S_1 \in [0, S_{m1}]$, i.e., either $S_1 = 0$ or $S_1 = S_{m1}$. The same argument applies to $S_2$. Therefore, it may be concluded that the maximum for J can only occur at one of the following points for $(S_1, S_2)$: (0, 0), (0, $S_{m2}$), ($S_{m1}$, 0) or ($S_{m1}$, $S_{m2}$). Obviously the first point cannot be maximum (J=1 is the minimum value). Thus, in order to achieve the maximum total data rate by selecting transmission power, one only has to search among the three transmission modes for $(S_1, S_2)$: (0, $S_{m2}$), ($S_{m1}$, 0) or ($S_{m1}$, $S_{m2}$).

In DSL technology, if the the $S_1$-to-$R_1$ direction is the downstream direction, i.e., from an Internet Service Provider (ISP) to an individual user, and the $S_2$-to-$R_2$ direction is the upstream direction, i.e., from the individual user to the ISP, then the three modes (0, $S_{m2}$), ($S_{m1}$, 0) and ($S_{m1}$, $S_{m2}$) correspond to upstream-only, downstream-only and full-duplex transmission modes, each at the maximum transmission powers. A maximum total data rate (upstream plus downstream) may be achieved by choosing among the three above-mentioned transmission modes. Through the rest of the description and in the claims, the terms "downstream" and "upstream" refer simply to two opposite directions of data flows. These terms are not necessarily limited to the DSL context.

Figure 2:
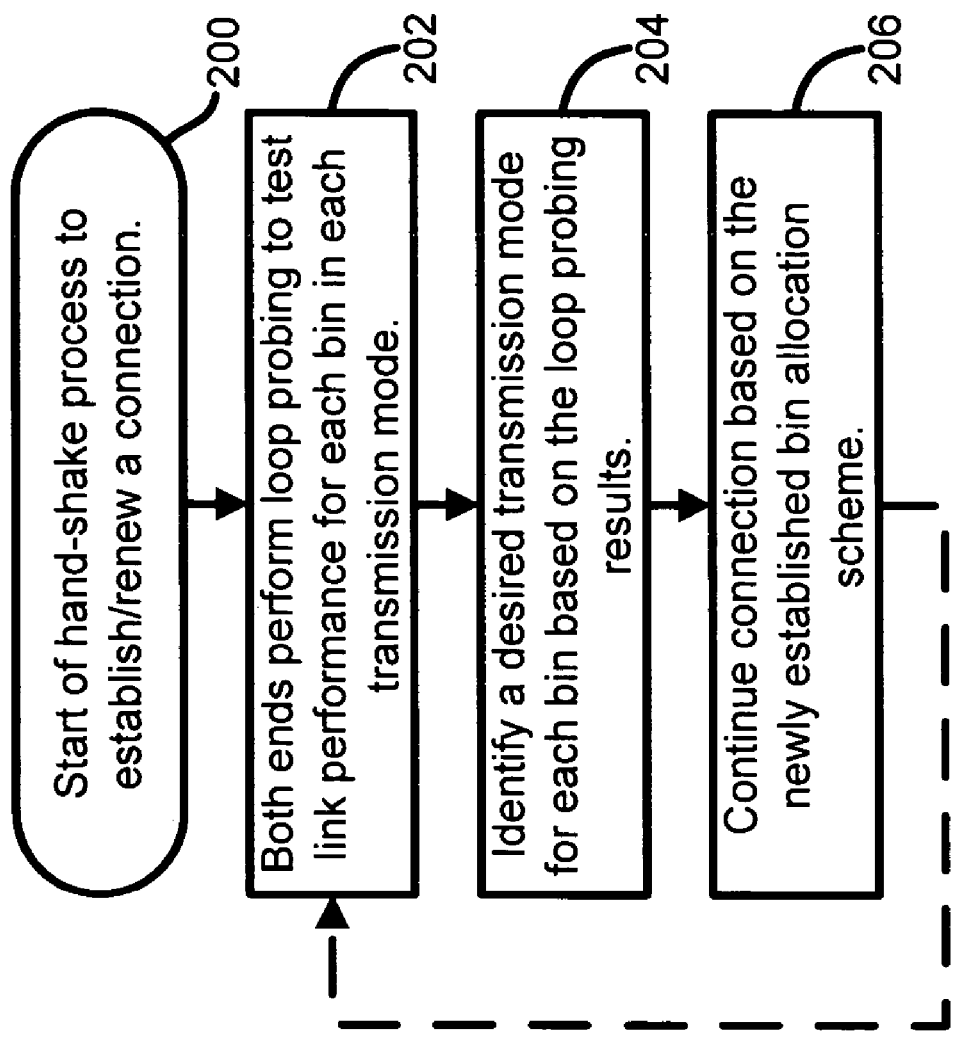
FIG. 2 is a flow chart illustrating an exemplary method for dynamic bin allocation in accordance with an embodiment of the present invention.

Referring now to FIG. 2, there is shown a flow chart illustrating an exemplary method for dynamic bin allocation in accordance with an embodiment of the present invention.

In step 200, two network elements may start a hand-shake process to establish or renew a connection between each other. The network elements may be any routers, switches, fixed or mobile hosts, servers, or the combination thereof. The two network elements may attempt to establish or renew a wired or wireless connection between each other. They may follow the normal hand-shake process to establish the connection (e.g., negotiating standards or protocols, authentication, and exchanging information, etc.).

In step 202, as part of the hand-shake process, the two network elements may coordinate with each other to perform loop probing. The main purpose for loop probing is to test the link performance for each bin in each transmission mode. According to one embodiment of the invention, loop probing may be performed in three phases: upstream-only, downstream-only and full-duplex, each at the maximum transmission powers. For example, in the downstream-only phase, all the bins are in downstream-only transmission mode, where one network element may utilize all the bins to transmit signals at the maximum transmission powers, and the other network element may record the received signals for each bin. In the upstream-only phase, all the bins are in upstream-only transmission mode, where the two network elements may switch roles in transmitting and receiving. In the full-duplex phase, all the bins are in full-duplex transmission mode, where both network elements may transmit at full power and at the same time receive and record the signals for each bin. Then, data associated with the signals recorded during the three probing phases may be passed to one of the network elements for processing. Based on the data recorded in the test transmissions, an SNR (or any other parameters indicative of the link performance) may be calculated for each bin in each of the three transmission modes.

In step 204, a desired transmission mode may be identified for each bin based on the SNRs calculated in step 202. For example, for each bin, the transmission mode that corresponds to the highest SNR may be selected as the most desirable mode. It should be noted that SNR is described here for illustration purpose only. Other parameters indicative of the link performance for each bin such as data rate, signal-to-interference ratio (SIR) may also be calculated and used as a basis for choosing the most desirable transmission mode.

In step 206, the connection between the two network elements may be established or renewed based on the newly established bin allocation scheme. When a desirable transmission mode is identified for each bin, a bin allocation scheme is effectively established and such scheme may be communicated to the other network element. In this scheme, some of the available bins may be assigned for upstream transmission only, some for downstream transmission only, and others for full-duplex transmission. Since each bin is operating in an optimized mode, the overall link performance based on the combination of the bins in their respective modes is expected to be optimized. According to embodiments of the invention, the bin allocation scheme may be established upon a new connection, or refreshed or modified during a connection, either periodically or triggered by certain network conditions. Therefore, the process depicted in FIG. 2 may loop back to step 202, if needed, to repeat the loop probing and dynamic bin allocation steps.

Figure 3:
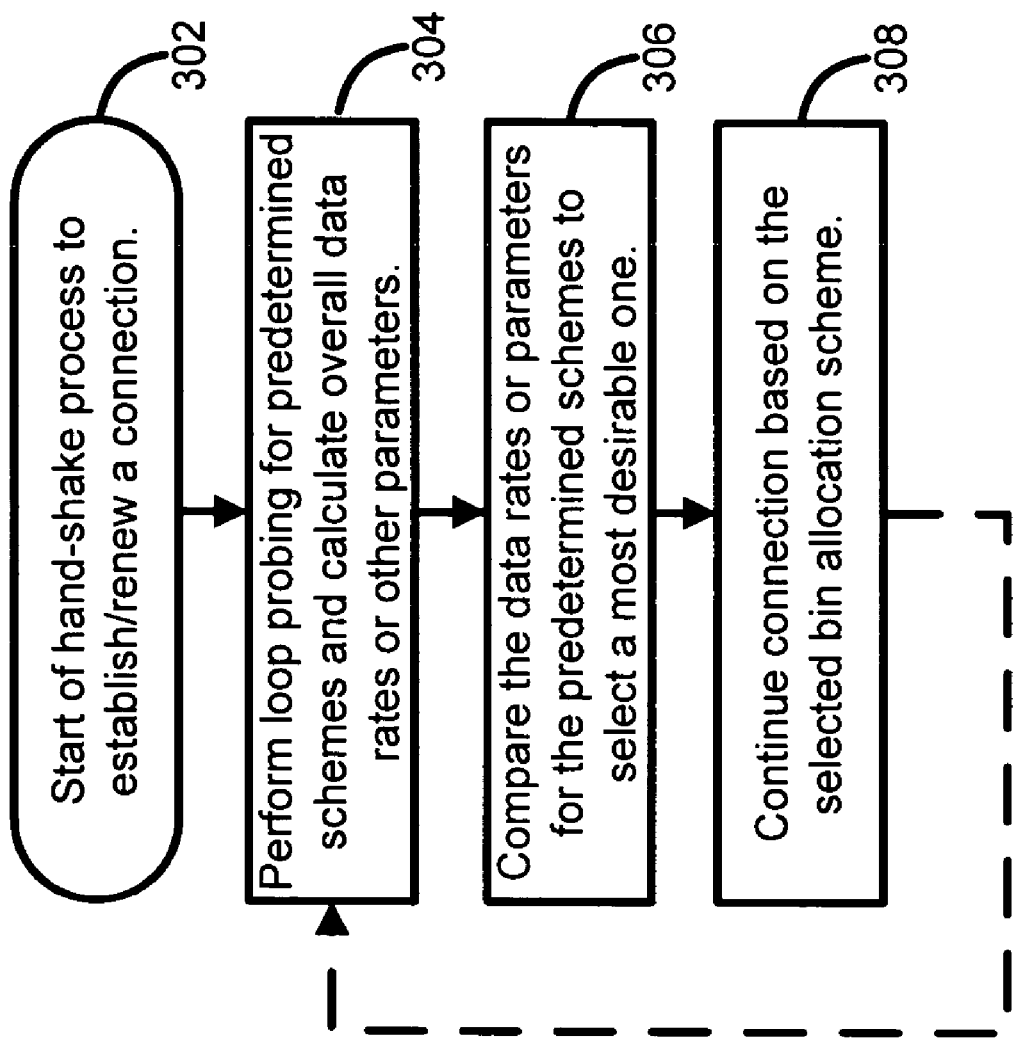
FIG. 3 is a flow chart illustrating another exemplary method for dynamic bin allocation in accordance with an embodiment of the present invention.

FIG. 3 is a flow chart illustrating another exemplary method for dynamic bin allocation in accordance with an embodiment of the present invention.

In step 302, two network elements may start a hand-shake process to establish or renew a connection between each other.

In step 304, the two network elements may perform loop probing for a number of predetermined bin allocation schemes. In each of the predetermined schemes, some of the available bins may have been assigned for upstream transmission only, some for downstream transmission only, and others for full-duplex transmission. For example, in one scheme (Annex A), bins 6 through 31 may be assigned to upstream only, and bins 33 through 255 may be assigned to downstream only. In another scheme (Annex A overlap), bins 6 through 31 may be assigned to both downstream and upstream traffic (full-duplex), and bins 33 through 255 may be assigned to downstream only. In yet another scheme (Annex A conforming to ATIS mask 5), bins 6 through 15 and 33 through 255 may be assigned to downstream only, and bins 16 through 31 may be assigned to upstream only. For each scheme, the two network elements may coordinate with each other to conduct full-power test transmissions according to the specified transmission mode for each bin. For example, to test the Annex A scheme, the two network elements may perform full-power upstream-only transmission in bins 6 through 31, and full-power downstream-only transmission in bins 33 through 255. Data associated with the received signals may be passed on to one of the network elements for processing. Based on these data, a total data rate (or any other parameters indicative of the overall link performance) may be calculated for each predetermined bin allocation scheme.

In step 306, the data rates (or other parameters) calculated in step 304 may be compared to identify the most desirable bin allocation scheme. For example, a predetermined bin allocation scheme that corresponds to the highest overall data rate or SNR may be deemed most desirable.

In step 308, the connection between the two network elements may be established or renewed based on the most desirable bin allocation scheme selected in step 306. Information associated with the selected scheme may be communicated to the other network element such that both ends will arrange the bins accordingly for transmission and receiving of data. If necessary, the process may loop back to step 304 to repeat the loop probing and dynamic bin allocation steps.

Between the two exemplary methods illustrated in FIG. 2 and FIG. 3 respectively, there may be different situations where one method may be preferable over the other. The number of test transmissions required in the loop probing step may be one factor for consideration. For example, the FIG. 2 method, where a desirable mode is determined for each bin, typically requires three test transmissions in the loop probing step (to cover the three possible modes for each bin). The number of test transmissions required for the FIG. 3 method may be the same as the number of predetermined schemes. In practice, it may be desirable to choose the method that requires the least number of test transmissions. To achieve the best possible link performance, it may seem natural to choose the FIG. 2 method over the FIG. 3 method because the latter is typically limited by the available pool of schemes. However, according to embodiments of the invention, sometimes it may be advantageous to choose among predetermined bin allocation schemes rather than determining a desired mode each bin, because it is usually easier to communicate the choice of a predetermined scheme to the other end, and spectrum compatibility may be ensured by pre-testing the predetermined schemes off-line.

Figure 4:
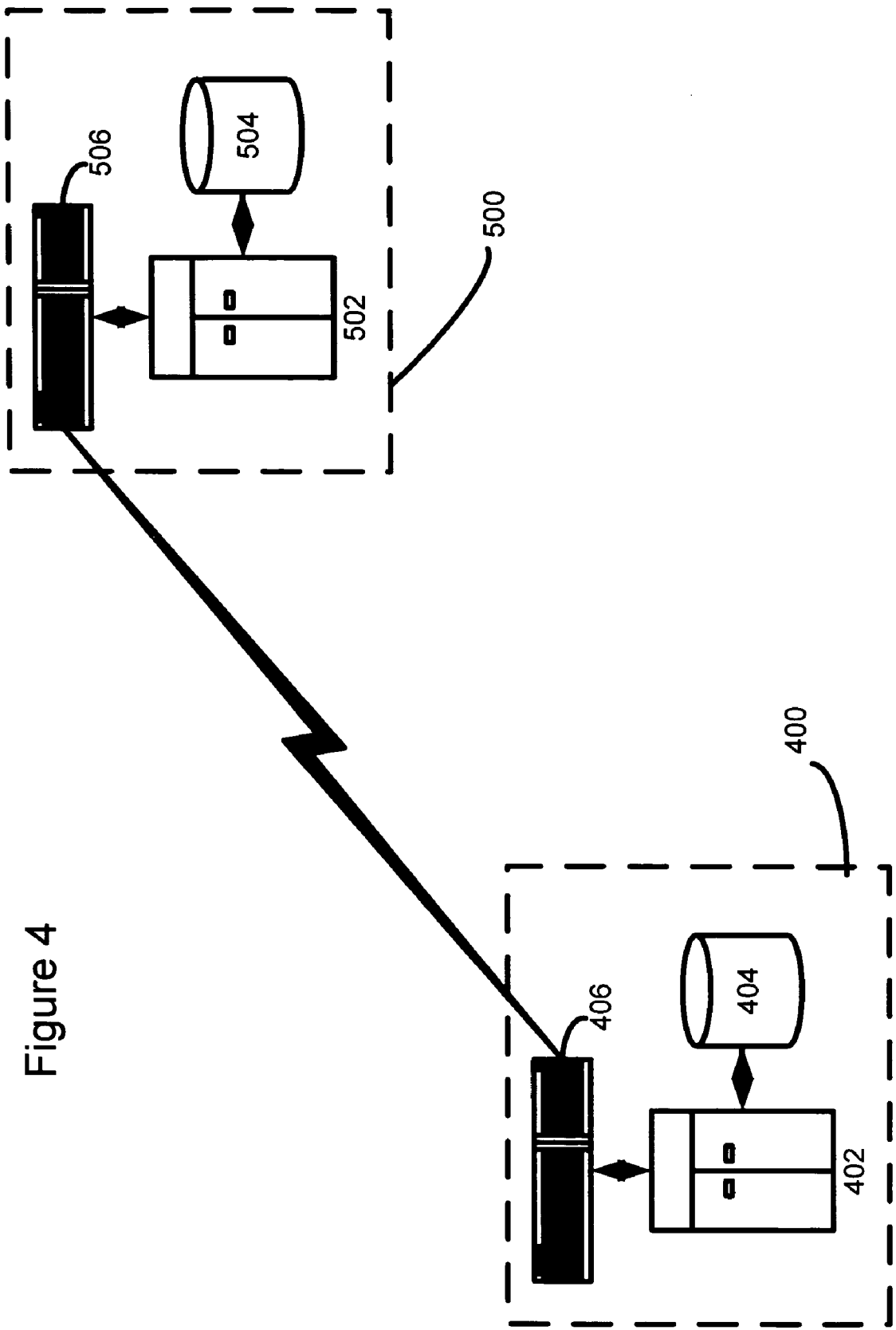
FIG. 4 is a block diagram illustrating an exemplary system for dynamic bin allocation in accordance with an embodiment of the present invention.

FIG. 4 is a block diagram illustrating an exemplary system for dynamic bin allocation in accordance with an embodiment of the present invention. In FIG. 4, there is shown two network elements (400 and 500) on which the dynamic bin allocation method may be implemented. Element 400 may comprise a processor module 402, a storage module 404 and a transceiver module 406. The processor module 402 may be a central processing unit (CPU), micro-controller, digital signal processing (DSP) unit or computer with data-processing and hardware-control functions. The storage module 404 may be a storage device, such as a semiconductor memory, non-volatile memory, hard drive disk, CD-ROM or similar, that is accessible by the processor module 402. Storage module 404 may hold data records associated with the link performance parameters, transceiver output powers and bin allocation schemes. The transceiver module 406 may be capable of transmitting and receiving signals or data packets. Element 500 may also comprise a processor module 502, a storage module 504 and a transceiver module 506. In operation, the processor modules (402 and 502) may control the transceiver modules (406 and 506) to perform loop probing. The loop probing data may be passed to one of the processors for processing and dynamic bin allocation. Once a desirable bin allocation scheme is identified, it may be communicated to the other end and recorded in the storage modules.

One advantage of the present invention is that the technique for dynamic bin allocation may be implemented without any physical modification or addition to existing network components. According to embodiments of the invention, a firmware upgrade may be sufficient to include the dynamic bin allocation steps in the hand-shake process. If the approach as illustrated in FIG. 3 is adopted, the firmware for dynamic bin allocation may be updated to reflect a change in the pool of predetermined schemes.

At this point it should be noted that the technique for dynamic bin allocation in accordance with the present invention as described above typically involves the processing of input data and the generation of output data to some extent. This input data processing and output data generation may be implemented in hardware or software. For example, specific electronic components may be employed in a computer and communications network or similar or related circuitry for implementing the functions associated with dynamic bin allocation in accordance with the present invention as described above. Alternatively, one or more processors operating in accordance with stored instructions may implement the functions associated with dynamic bin allocation in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

The invention claimed is:

1. A method for dynamic bin allocation, the method comprising:
    obtaining link performance data based on a plurality of test transmissions between two network elements, wherein the plurality of test transmissions comprises an upstream transmission, a downstream transmission, and a full-duplex transmission, the plurality of test transmissions performed in every channel of a discrete multi-tone (DMT) communications system and each performed at a maximum transmission power;
    determining a desired transmission scheme for the discrete multi-tone communications system, wherein each channel of the discrete multi-tone communications system is designated a transmission mode based on the link performance data, wherein the link performance data comprises at least one of a data rate, an error rate, a signal-to-interference ratio, and a signal-to-noise ratio and the transmission mode is selected from an upstream mode, a downstream mode, and a full-duplex mode; and
    assigning the desired transmission scheme to a connection between the two network elements in the discrete multi-tone communications system.

2. The method according to claim 1, wherein
    the link performance data are obtained for each of a plurality of predetermined transmission schemes; and
    the desired transmission scheme is selected from the plurality of predetermined transmission schemes based on the link performance data.

3. The method according to claim 2, wherein the test transmissions are based on the plurality of predetermined transmission schemes.

4. The method according to claim 1 further comprising communicating the desired transmission scheme to at least one of the two network elements and continue communications between the two network elements based on the desired transmission scheme.

5. The method according to claim 1, wherein the plurality of frequency ranges are defined based on an orthogonal frequency division multiplexing (OFDM) technology.

6. The method according to claim 1, wherein the connection further comprises a digital subscriber line (DSL).

7. A system for dynamic bin allocation, the system comprising a first network element and a second network element, wherein each of the first network element and the second network element comprises at least a processor module and a transceiver module that are coordinated to
    obtain link performance data based on a plurality of test transmissions between the first network element and the second network element, wherein the plurality of test transmissions comprises an upstream transmission, a downstream transmission, and a full-duplex transmission, the plurality of test transmissions performed in every channel of a discrete multi-tone (DMT) communications system and each performed at a maximum transmission power;

determine a desired transmission scheme for the discrete multi-tone communications system, wherein each channel of the discrete multi-tone communications system is designated a transmission mode based on the link performance data, wherein the link performance data comprises at least one of a data rate, an error rate, a signal-to-interference ratio, and a signal-to-noise ratio and the transmission mode is selected from an upstream mode, a downstream mode, and a full-duplex mode; and assign the desired transmission scheme to a connection between the two network elements in the discrete multi-tone communications system.

8. The system according to claim 7, wherein the link performance data are obtained for each of a plurality of predetermined transmission schemes; and the desired transmission scheme is selected from the plurality of predetermined transmission schemes based on the link performance data.

9. A system for dynamic bin allocation, the system comprising:

means for obtaining link performance data based on a plurality of test transmissions between two network elements, wherein the plurality of test transmissions comprises an upstream transmission, a downstream transmission, and a full-duplex transmission, the plurality of test transmissions performed in every channel of a discrete multi-tone (DMT) communications system and each performed at a maximum transmission power;

means for determining a desired transmission scheme for the discrete multi-tone communications system, wherein each channel of the discrete multi-tone communications system is designated a transmission mode based on the link performance data, wherein the link performance data comprises at least one of a data rate, an error rate, a signal-to-interference ratio, and a signal-to-noise ratio and the transmission mode is selected from an upstream mode, a downstream mode, and a full-duplex mode; and means for assigning the desired transmission scheme to a connection between the two network elements in the discrete multi-tone communications system.

10. The system according to claim 9, wherein the link performance data are obtained for each of a plurality of predetermined transmission schemes; and the desired transmission scheme is selected from the plurality of predetermined transmission schemes based at least on the link performance data.

11. A computer readable medium having code for causing a processor to perform dynamic bin allocation, the computer readable medium comprising:

code adapted to obtain link performance data based on a plurality of test transmissions between the first network element and the second network element, wherein the plurality of test transmissions comprises an upstream transmission, a downstream transmission, and a full-duplex transmission, the plurality of test transmissions performed in every channel of a discrete multi-tone (DMT) communications system and each performed at a maximum transmission power;

code adapted to determine a desired transmission scheme for the discrete multi-tone communications system, wherein each channel of the discrete multi-tone communications system is designated a transmission mode based on the link performance data, wherein the link performance data comprises at least one of a data rate, an error rate, a signal-to-interference ratio, and a signal-to-noise ratio and the transmission mode is selected from an upstream mode, a downstream mode, and a full-duplex mode; and code adapted to assign the desired transmission scheme to a connection between the two network elements in the discrete multi-tone communications system.

12. The computer readable medium according to claim 11, wherein the link performance data are obtained for each of a plurality of predetermined transmission schemes; and the desired transmission scheme is selected from the plurality of predetermined transmission schemes based on the link performance data.

* * * * *